Aug. 16, 1960    J. BELL    2,949,032
THERMOMETER
Filed April 2, 1959

INVENTOR.
JEROME BELL
BY Eugene O. Retter
George J. Brennan
Attnys.

United States Patent Office 2,949,032
Patented Aug. 16, 1960

2,949,032

THERMOMETER

Jerome Bell, Schoolcraft, Mich., assignor to The Upjohn Company, Kalamazoo, Mich., a corporation of Delaware Filed Apr. 2, 1959, Ser. No. 803,613

2 Claims. (Cl. 73—353)

This invention relates to a novel air and water thermometer which is floatable in water.

The thermometer of this invention comprises a bimetallic spring with attached indicator mounted on a disk-like plastic housing so that the indicator is suspended over the upper surface of the face of the housing and the spring projects downwardly from the face of the housing. The floatable characteristics of the thermometer are provided by the combination of (1) a series of compartments arranged around the periphery of the lower surface of the face of the housing which are open downwardly only, thus providing air pockets when the thermometer is placed upright in water, and (2) an opening in the face of the housing toward the center thereof and under the bimetallic spring, thus permitting water to rise in the center position of the housing and contact the spring while at the same time stabilizing the thermometer when placed in water, thus reducing any tendency to tip. Although a thermometer of the general construction described above, but without the hole in the face, would be floatable if perfectly balanced, such a thermometer would readily tip in water, thus releasing the trapped air and causing the thermometer to sink. The thermometer of the invention, because of the higher water level in the center section when placed in water, has little tendency to tip even without balanced construction. The advantage of a floating thermometer when using very hot water or water turbid with soap or detergent is obvious. Also, a floatable thermometer of the claimed construction is useful as an air thermometer, this multiple utility being accomplished with inexpensive, single-cast plastic housing, requiring olny a simple mounting for the bimetallic spring and attached indicator, thus rendering the thermometer commercially attractive and competitive with the thermometers now available.

Referring to the accompanying drawing which illustrates a preferred embodiment of the claimed thermometer, Fig. 1 is a front plan view;

Figure 1:
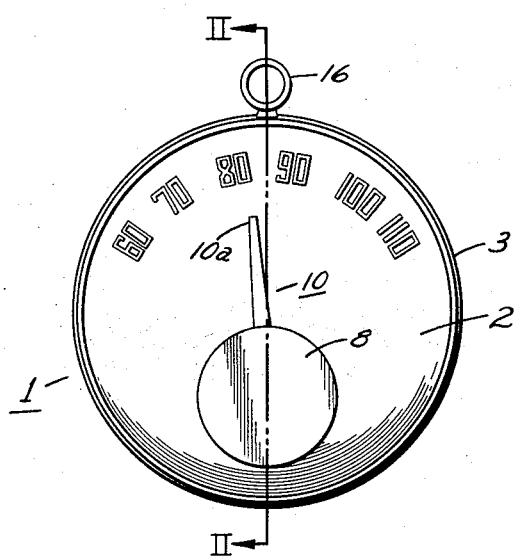

In the drawings the circular thermometer housing 1 is provided with a dish-shaped concave face 2. A continuous peripheral vertical wall 3 depends to the edge of face 2, projecting well above and below the highest and lowest point, respectively, of the face 2. An off-center hole 4 is provided in the face 2. A vertical circular wall 5, projecting above and below the face 2, depends to the edge of and circumscribes about two-thirds of the hole 4, ending inwardly to the face 2 at points 6 and 7. A circular horizontal plate 8, of the same diameter as and positioned coaxially over hole 4, is mounted to wall 5. A bimetallic spring 9 with attached indicator 10 is mounted on a stud 11 depending axially from the underside of plate 8 so that the free end 10a of the indicator 10 projects through the space 12 provided between the plate 8 and the face 2 and is positioned over the face 2.

Figure 2:
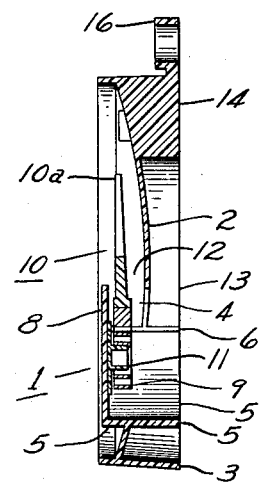
Fig. 2 is a sectional view along the line II—II of Fig. 1.
Figure 3:
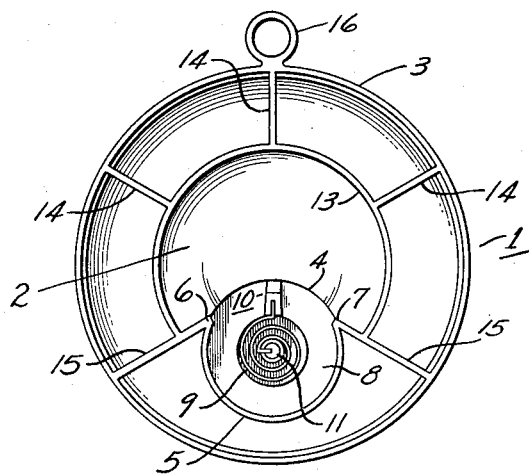
Fig. 3 is a back plan view.

The floatable characteristics of the thermometer are provided by peripheral compartments formed by a series of vertical walls attached to the undersurface of the face 2 of the thermometer, as shown in Figs. 2 and 3. An inner circular vertical wall 13 is connected to the peripheral wall 3 by a series of vertical radial walls 14. The inner wall 13 ends dependently at a pair of oblique vertical walls 15, positioned on either side of hole 4 at an angle of about 120° to each other. The walls 15 also connect the ends of wall 5 at points 6 and 7 with the wall 3.

As shown in Fig. 2 the vertical walls 3, 5, 13, 14 and 15 terminate in a common horizontal plane so that the thermometer rests flat on horizontal surface. A bracket 16 is provided for hanging the thermometer on a wall.

When the above-described thermometer is placed face up in water, air is trapped in the peripheral compartments formed by walls 3, 5, 13, 14 and 15, thus rendering the thermometer floatable. Air escapes through hole 4, thus permitting water to rise in the center compartment defined by walls 5, 13 and the inward portion of walls 15 and thereby contact the bimetallic spring 9. The raised water level in the center compartment maintains the thermometer in a stable floating position.

I claim:

1. A floatable thermometer comprising a bimetallic spring with needle indicator attached thereto and a disk-like plastic housing for said bimetallic spring having a face comprising a raised portion and a lowered portion with a hole therein below said raised portion, said bimetallic spring being mounted on the underside of said raised portion of said face over said hole with the free end of said indicator being positioned above the upper surface of said lowered portion of said face, said housing having a series of vertical walls depending from the lower surface of and extending outwardly from the center of said face and forming, cooperatively with said face, compartments opening downwardly only, said compartments having a volume sufficient to render the thermometer floatable when placed face up in water.

2. A floatable thermometer comprising a bimetallic spring with needle indicator attached thereto; a circular disk-like plastic housing for said bimetallic spring, said housing having a concave face containing an off-center hole; a horizontal raised plate positioned over said hole, said plate being attached to said housing toward the periphery of said face and suspended toward the ecnter of said face, said bimetallic spring being mounted on the underside of said plate with the free end of said indicator being positioned over the upper surface of said face, and said housing having a series of vertical walls depending from the lower surface of said face and forming, cooperatively with said face, compartments around the periphery of said housing opening downwardly only, said compartments having a volume sufficient to render the thermometer floatable when placed face up in water.

References Cited in the file of this patent

UNITED STATES PATENTS 2,019,221     Hastings _____ Oct. 29, 1935
2,282,277     Whittier _____ May 5, 1942